US005722616A

United States Patent [19]

Durand

[11] Patent Number: 5,722,616

[45] Date of Patent: Mar. 3, 1998

[54] CONICAL ROTARY ACTUATOR AND ITS APPLICATION TO THE CONTROL OF A RUDDER

[75] Inventor: Yves Durand, Aussonne, France

[73] Assignee: Societe Nationale Industrielle et Aerospatiale, Paris, France

[21] Appl. No.: 562,761

[22] Filed: Nov. 27, 1995

[51] Int. Cl.$^6$ .......... B64C 13/36

[52] U.S. Cl. .......... 244/78; 244/75 R; 244/226; 92/122; 92/125

[58] Field of Search .......... 244/78, 75 R, 244/225, 226, 130; 92/122, 125

[56] References Cited

U.S. PATENT DOCUMENTS

| | | | |
|---|---|---|---|
| 2,870,748 | 1/1959 | Hemphill . | |
| 2,951,470 | 9/1960 | Self | 92/125 |
| 2,966,144 | 12/1960 | Self | 92/125 X |
| 2,984,221 | 5/1961 | Van Voorhees | 92/125 X |
| 3,020,008 | 2/1962 | Rumsey | 244/226 |
| 3,053,232 | 9/1962 | Self | 92/122 X |
| 4,738,415 | 4/1988 | Weyer | 244/78 |
| 4,789,119 | 12/1988 | Bellego et al. | 244/226 |
| 4,838,104 | 6/1989 | Riley | 244/78 X |
| 4,945,779 | 8/1990 | Williams | 244/78 X |
| 5,098,043 | 3/1992 | Arena | 244/75 R X |

FOREIGN PATENT DOCUMENTS

| | | |
|---|---|---|
| 0 169 511 | 1/1986 | European Pat. Off. . |
| 10 24 804 | 2/1958 | Germany . |

*Primary Examiner*—William Grant
*Attorney, Agent, or Firm*—Michael N. Meller

[57] ABSTRACT

A rotary actuator (16) has an inner body (32) forming a rotor and at least one outer body (34) forming a stator. The inner body (32) and outer body (34) carry blades (40,44) arranged in an alternating manner and defining between them two series of variable volume chambers. The cross-section of the chambers and the height of the triangular blades (40,44) decreases from one end to the other, as a result of a substantially frustum-shape of the inner body (32). Such an actuator (16) can be used for controlling an aircraft rudder or control surface and it is then positioned along the articulation axis of the rudder or control surface.

16 Claims, 5 Drawing Sheets

CONICAL ROTARY ACTUATOR AND ITS APPLICATION TO THE CONTROL OF A RUDDER

BACKGROUND OF THE INVENTION

1. Field of the Invention

The invention relates to a rotary actuator comprising an inner body and at least one outer body fitted coaxially in one another so as to be able to perform a relative rotary movement, each of the actuator bodies carrying blades arranged in alternating manner so as to define two series of tight, variable volume, control chambers.

2. Related Prior Art

The invention also relates to an aircraft rudder or control surface having at least one articulated panel, whose pivoting is controlled by such a rotary actuator.

Normally, the inner and outer bodies of the rotary actuators have in each case a cylindrical configuration and the height of the blades carried by each of these bodies is uniform from one end to the other of the said blades. The number of blades equipping the actuator is mainly dependent on the amplitude of the pivoting movement which it is wished to control.

Taking account of this constraint, rotary actuators are used for controlling pivoting movements of limited amplitude between two parts. They then have the advantage of very small overall dimensions, because they can be positioned in accordance with the relative pivoting axis between the parts. By comparison, the control of the same movement with the aid of a linear actuator makes it necessary to install the actuator on one of the parts, perpendicular to the pivoting axis and to connect the other part with the aid of a mechanism including at least one articulated link.

In a rotary actuator, the pressure alternatively applied in each of the two series of actuator chambers tends to deform in the opposite direction the inner and outer bodies of the actuator. Consequently, the sealing of the chambers which is indispensable to the operation of the actuator can only be ensured when the latter does not exceed a certain length for a given control pressure. A conventional cylindrical, rotary actuator can not therefore be used for controlling the relative rotation of two parts when the hinge moment which it is wished to apply between the parts exceeds a certain value.

When the hinge moment which it is wished to apply between the parts is excessive, it is possible to place two rotary actuators at an end, each being able to exert half the necessary hinge moment. However, this leads to a very significant increase in the cost of the installation, particularly due to the increase in the number of bearings used for transmitting forces between the actuators and each of the parts. Thus, a conventional, cylindrical, rotary actuator is normally engaged by two bearings on each of two parts, which controls a relative rotary movement. The use of two rotary actuators for controlling this movement would consequently require eight bearings.

The overall dimensional advantages offered by rotary actuators makes it particularly attractive to use them for controlling the rudders of aircraft and in particular the elevons equipping supersonic aircraft.

Thus, the housing of such actuators in the leading edge of the rudders would eliminate all aerodynamic disturbances normally caused by the presence of linear actuators controlling the rudders, despite the possible presence of fairings on said actuators.

Due to the fact that the rudders have rigidity characteristics different from those of the wings, there are differences between the flight deformations of the rudders and the wings. For aerodynamic reasons, the maximum values of these differences must be as low as possible. This can lead to the construction of each rudder in the form of several panels, which must then be controlled independently of one another. In the hypothesis of using two cylindrical actuators per panel, the installation of the actuators in the rudder would require the presence of 16 or 24 bearings, as a function of whether the rudder was subdivided over two or three panels.

Moreover, the redundancy imposed by safety rules generally makes it necessary to control the rudders of aircraft with the aid of three separate hydraulic circuits. Taking into account of this requirement combined with the construction of the rudders in the form of several panels naturally leads to the subdivision of each rudder into three panels. The use of cylindrical, rotary actuators would then involve the use of six actuators for each rudder, which would lead to the presence of 24 bearings. Therefore this solution becomes too costly and is unacceptable in practice.

SUMMARY OF THE INVENTION

A main object of the invention is an originally designed rotary actuator having for given diametral dimensions, a power substantially higher than than of a conventional, cylindrical, rotary actuator.

Another object of the invention also relates to a rotary actuator, whose original design makes it possible to reduce the number of bearings necessary for the transmission of forces between the actuator and the part and consequently the cost of an installation using such actuators.

The invention also relates to a rotary actuator, whose original design makes it possible to reduce the torsional deformations of at least one of the inner and outer bodies of the actuator compared with conventional, rotary actuators.

According to the invention, these objects are achieved by means of a rotary actuator comprising an inner body and at least one outer body fitted coaxially in one another, so as to define between them at least one annular space, first blades and second blades respectively integral with the inner body and the outer body and arranged in alternating manner in said annular space, in order to alternatively define there first and second variable volume, tight control chambers, whereof an alternate pressurization controls a relative rotation between the inner and outer bodies, characterized in that at least one of the inner and outer bodies has a tapered section, so that the first and second blades have a height decreasing from one end to the other of said blades.

A rotary actuator complying with this definition will be referred to hereinafter as "conical rotary actuator". This designation, which results from the tapered character of the section of the annular space formed between the inner and outer bodies of the actuator, must not be considered as limiting the configuration of said annular space to a precise geometrical shape.

In a preferred embodiment of the invention, the outer body is cylindrical and has a constant section, whereas the inner body has a tapered section.

In this case, the body can have a substantially frustum-shaped portion and a substantially cylindrical portion extending a relatively small diameter end of the substantially frustum-shaped portion.

The relatively large diameter end of the substantially frustum-shaped portion of the inner body then has an external diameter substantially equal to the internal diameter of the outer body.

In the preferred embodiment of the invention, the inner body constitutes a actuator rotor, whereas the outer body constitutes the actuator stator. However, in certain applications, a reverse arrangement can be adopted.

The inner body of the actuator is advantageously a tubular body. This feature makes it possible to connect the inner body to a temperature conditioning circuit ensuring a circulation within the actuator of a heat transfer fluid able to heat or cool the actuator as a function of the conditions of use.

In the preferred embodiment of the invention, the rotary actuator comprises two outer bodies mounted coaxially on the two portions of the inner body, each of said two portions carrying second blades arranged in alternating manner with the first blades carried by each of the outer bodies.

The rotary actuator then advantageously has a symmetry with respect to a median plane centrally intersecting the inner body. Moreover, the heights of the first and second blades increase from the median plane of the actuator towards its ends.

Preferably, the inner body comprises, between the two portions carrying the second blades, a central force transmitting portion. In the same way, each of the outer bodies comprises a terminal force transmission portion in the vicinity of each of the actuator ends.

The invention also relates to an aircraft rudder or control surface, having at least one panel articulated on a rear spar of an aircraft wing element, about an articulation axis substantially parallel to said rear spar, and means for controlling the pivoting of the panel about said articulation axis, characterized in that the pivoting control means have at least one conical rotary actuator according to the invention located in the panel along the articulation axis thereof.

The terminal force transmission portions of the rotary actuator are then fitted in first bearings carried by the rear spar and the central force transmission portion of the rotary actuator is fitted in a second bearing carried by the panel. As a result of this feature, the control of a rudder formed from three separate panels only requires nine bearings. Therefore the number of bearings is roughly reduced by two thirds compared with a rudder using conventional, cylindrical, rotary actuators.

In order that the deformations of the wings due to the bending thereof are not transmitted to the actuator, each of the first bearings is carried by the rear spar so as to be able to rotate about a first axis perpendicular to the spar and passing through the articulation axis of the panel. In order to ensure force transmission between the wing and the outer body of the actuator, each of the first bearings is engaged on the terminal force transmission portions of the actuator by first rotation linking means about the articulation axis of the panel. In the same way, the transmission of forces between the inner tube of the actuator and the panel is ensured by second rotation linking means around the articulation axis, by which the second bearing is engaged on the central force transmission portion of the actuator. These first and second rotation linking means are constituted by splines or any other equivalent mechanism permitting the direct transmission of forces in the vicinity of the wing skin panels.

In order to ensure the connection between the outer body of the actuator and the wing in the direction of the articulation axis of the panel, whilst permitting a differential deformation of the wing with respect to the actuator, one of the first bearings is engaged on one of the terminal force transmission portions of the actuator by first translation linking means in accordance with the aforementioned articulation axis. However, the other first bearing is free to move parallel to said articulation axis with respect to the other terminal force transmission portion of the actuator. In comparable manner, the second bearing is engaged on the central force transmission portion of the actuator by second translation linking means in accordance with the articulation axis.

DRAWINGS

In a preferred embodiment of the rudder according to the invention, said rudder comprises at least two panels interconnected by at least one shackle, a rotary actuator being housed in each of the panels.

The invention is described in greater detail hereinafter relative to non-limitative inventions and the attached drawings, wherein show:

FIG. 1 A plan view of a supersonic aircraft, showing the location of the elevons, which can be controlled with the aid of conical rotary actuators according to the invention.

FIG. 2 A plan view, with partial breaking away, showing on a larger scale the location of the control actuators of one of the inboard elevons of the aircraft illustrated in FIG. 1.

FIG. 3 A plan view on a larger scale and in part longitudinal section of one of the conical control actuators of the inboard elevon of FIG. 2.

FIG. 4 An exploded perspective view of part of the actuator of FIG. 3.

FIG. 5 A sectional view along line V—V of FIG. 3, showing on a larger scale one of the bearings by which the actuators are connected to the rear spar of the corresponding wing.

FIG. 6 A sectional view along line VI—VI of FIG. 3 showing the bearing by which the actuator is connected to the corresponding inboard elevon panel.

DETAILED DESCRIPTION

A preferred embodiment of the conical rotary actuator according to the invention will now be described in connection with its control of the elevons of a supersonic aircraft. It is pointed out that the advantages resulting from the conical rotary actuator according to the invention can lead to the use of one or more such actuators in numerous other applications.

Figure 1:
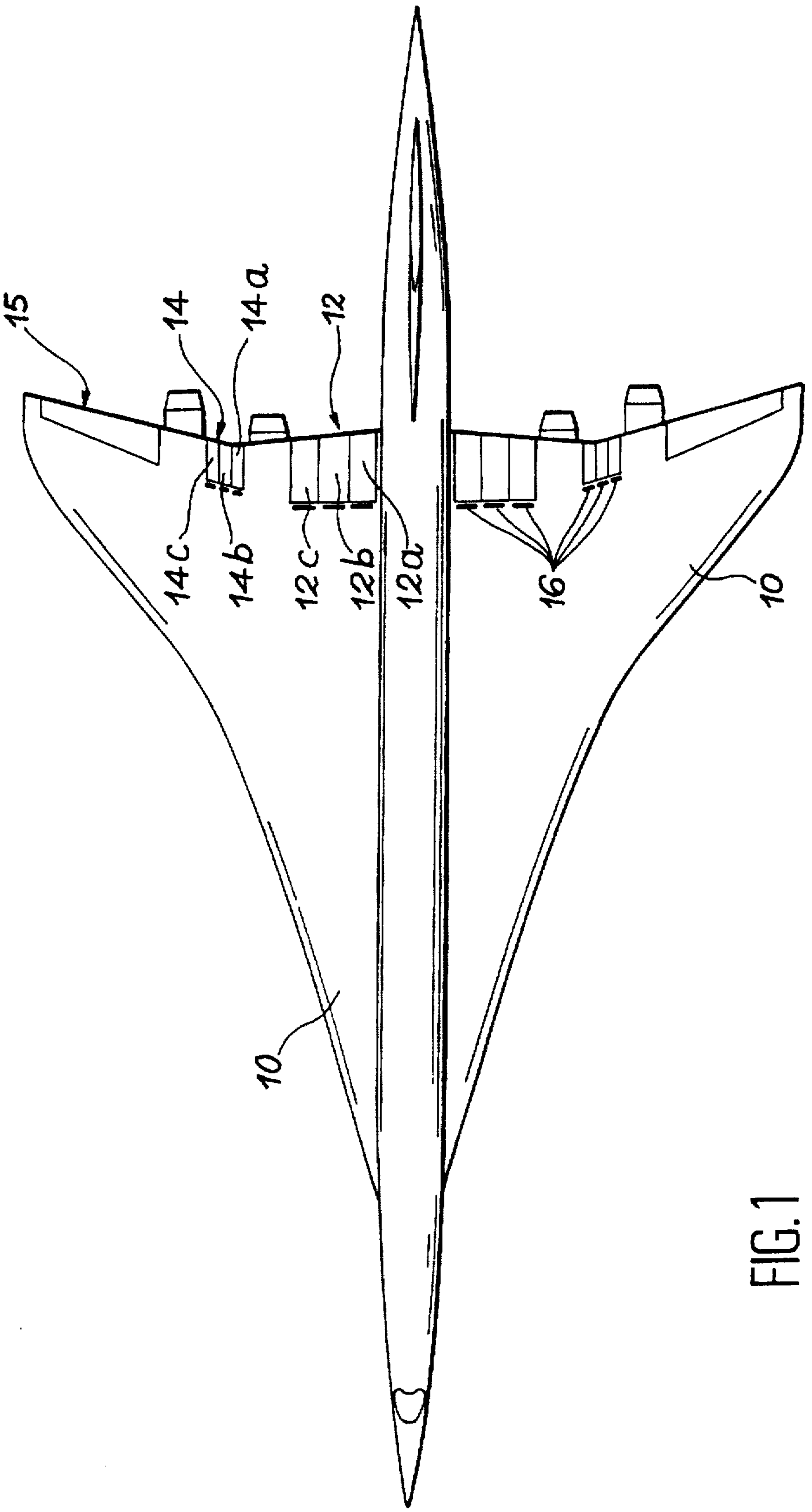

In FIG. 1, each of the wings of a supersonic aircraft is designated 10. Each wing 10 has on its trailing edge an inboard elevon 12, a median elevon 14 and an outboard elevon 15. These elevons constitute rudders or control surfaces fulfilling different functions, namely roll and depth.

Each of the elevons 12, 14 and 15 is fitted in pivoting manner to the rear spar 18 (FIG. 2) of the corresponding wing, about an axis xx' substantially parallel to said spar. Each elevon has a limited deflection, e.g. ±25° with respect to its median position where it is aligned with the wing.

In order to take account both of the different rigidity of the elevons 12 and 14 and the wings 10, as well as the need to control each of said elevons by three separate hydraulic circuits in order to ensure the redundancy necessary for safety, each of the elevons 12 and 14 is subdivided into three adjacent, articulated panels with substantially identical dimensions, in accordance with the dimension defined by the rear spar 18. These three panels are designated by the references **12*a*, 12*b* and 12*c* for the inboard elevons 12 and 14*a*, 14*b* and 14*c* for the median elevons 14. In accordance with the invention each of the panels 12a, 12b and 12c and 14a, 14b and 14c is controlled by a conical rotary actuator 16. More specifically, the three conical rotary actuators 16 associated with each of the elevons 12 and 14** are identical.

Figure 2:
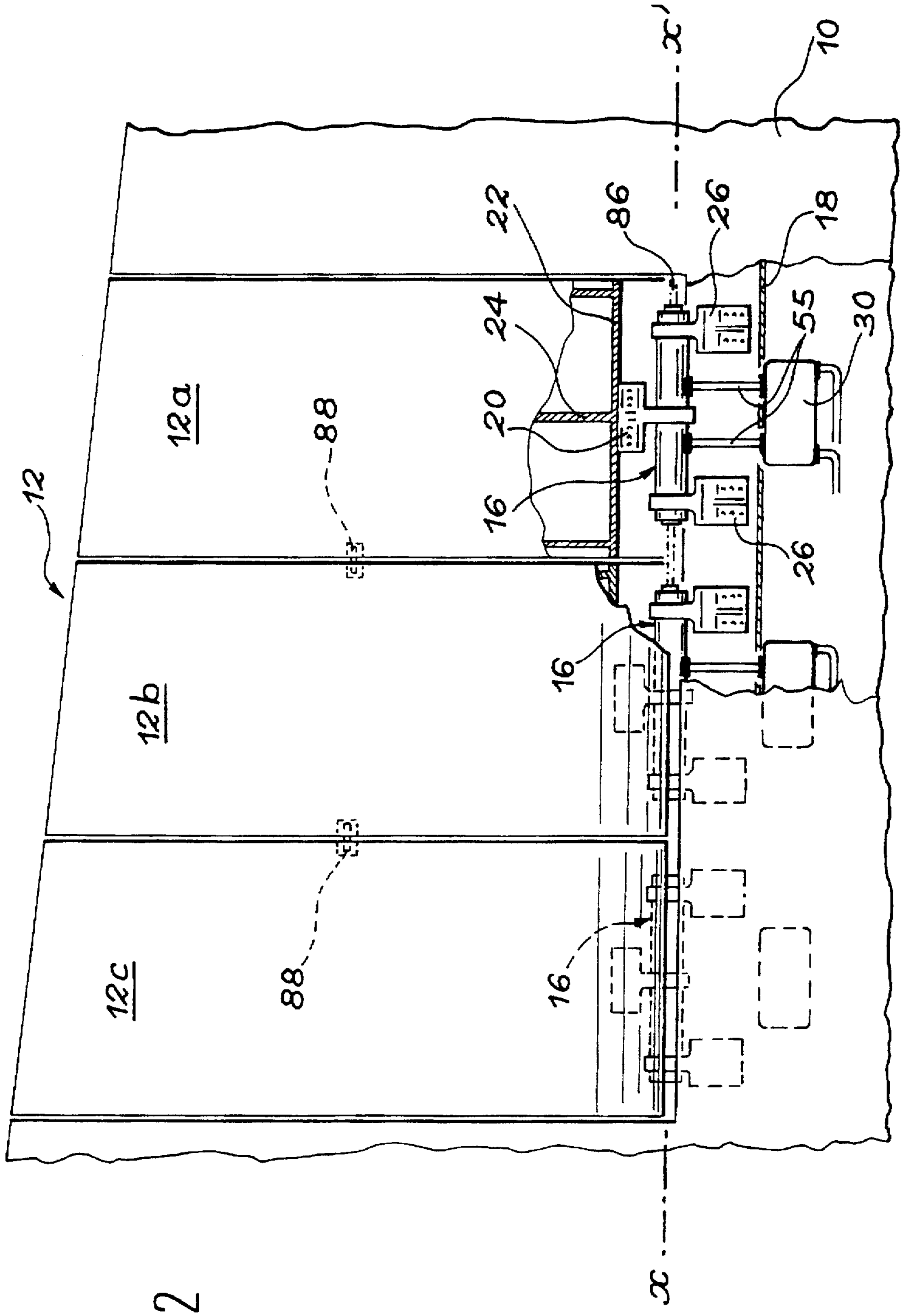

FIG. 2 shows in greater detail the installation of the three actuators 16 used for controlling the three panels 12a, 12b and 12c of one of the inboard elevons 12. The installation of the actuators controlling the other elevons is based on the same principle and will consequently not be described.

As is illustrated in FIG. 2, the three actuators 16 ensuring the control of the elevons 12 have a symmetry of revolution about an axis coinciding with the elevon pivoting axis xx'. Each actuator 16 is housed in the trailing edge of the corresponding panel 12a, 12b or 12c.

More specifically, each of the conical rotary actuators 16 has a central force transmission portion connected by a bearing 20 to the front spar 22 and to the median main rib 24 of the corresponding panel.

Moreover, each of the conical rotary actuators 16 has two terminal force transmission portions connected by two bearings 26 to the rear spar 18 of the corresponding wing 10.

Each of the conical rotary actuators 16 is supplied with pressurized hydraulic fluid by a hydraulic unit 30. In the case of the inboard elevons 12, the hydraulic units 30 are located on the rear spar 18 of the wing, so as to provide between said spar and the leading edge of each of the elevon panels a space permitting the passage of a certain number of lines or ducts linking the engines to the aircraft fuselage. In the case of differently installed rudders, such as the median elevons 14 of FIG. 1, the hydraulic units can be installed directly on the actuators 16.

The structure of one of the conical rotary actuators 16 according to the invention will now be described in detail with reference to FIGS. 3 and 4. As illustrated therein, in the embodiment shown, the conical rotary actuator 16 according to the invention has an inner tubular body 32 forming a rotor end two outer tubular bodies 34 forming a stator, which are fitted coaxially.

More specifically, the inner tubular body 32 has a central force transmission portion 36 to be engaged on the bearing 20 in a way which will be described hereinafter. On either side of said central force transmission portion 36, the inner body 32 has two tubular portions 38, which are symmetrical to the median plane of the actuator coinciding with the sectional plane VI—VI in FIG. 3.

The two outer bodies 34 are identical and each of them is received on one of the tubular portions 38 of the inner body 20, so as no define between said portion 38 and the corresponding outer body 34 an annular space which is tight towards the outside. In the vicinity of the actuator ends, each outer body 34 has on its outer surface a terminal force transmission portion 62 for engaging on a corresponding bearing 26, in a manner to be described hereinafter.

Figure 5:
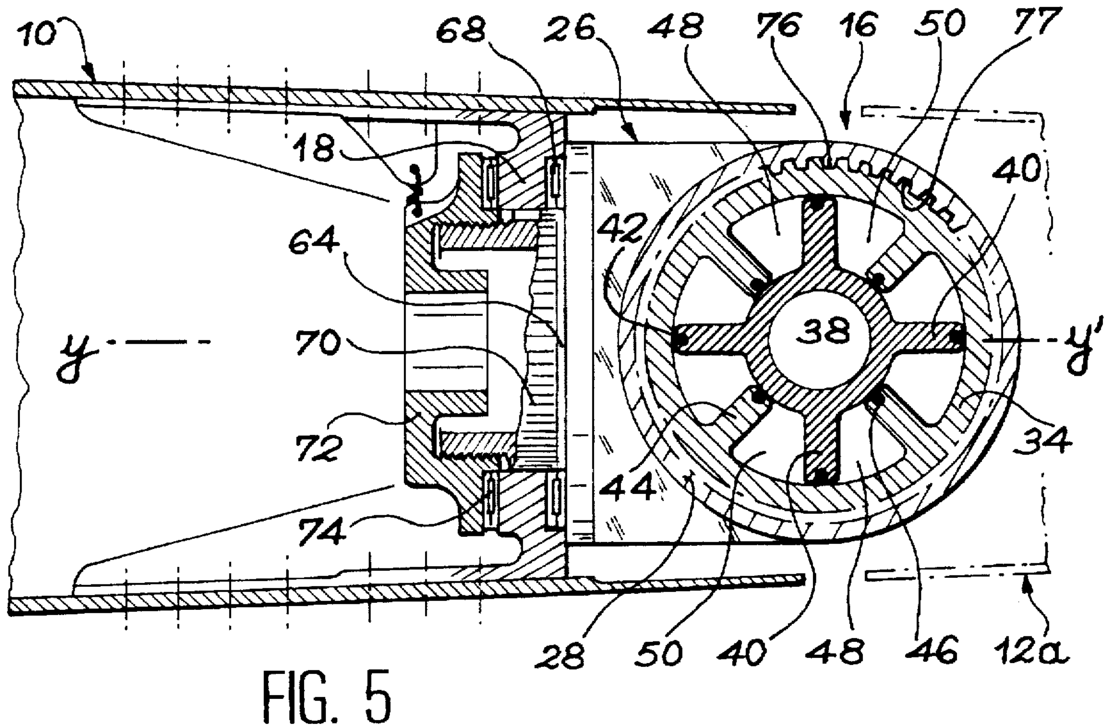

Each of the tubular portions 38 of the inner body 32 carries on its outer surface blades 40 oriented radially towards the outside (FIG. 5). These blades 40 are radially distributed over the periphery of the tubular portion 38 and there are e.g. four of them in the embodiment shown. The edges of the blades 40 turned towards the corresponding outer body 34 carry seals 42 ensuring contact sealing between said two parts.

In a comparable manner, each of the outer bodies 34 carries on its inner surface blades 44 oriented radially towards the inside. The blades 44 are regularly distributed around the axis of the actuator and their number is the same as that of the blades 40, so that the blades 40 and are arranged in alternating manner around the actuator axis. In the embodiment shown, each of the outer bodies 34 consequently also has four blades 44. The edges of the blades 44 turned towards the inner bodies 32 carry seals 46, which are in tight contact with the outer surface of the corresponding tubular portion 38 of the inner body 32.

As a result of the arrangement described hereinbefore and in accordance with a standard configuration in rotary actuators, the annular space defined between each outer body 34 and the tubular portion 38 of the inner body 32 is subdivided by alternating blades 40, 44 into two series of variable volume chambers, designated by the references 48 and 50 in FIG. 5.

The fitting of each of the outer bodies 34 on the inner body 32 of the actuator takes place in such a way as to permit a relative rotation between these two parts. For this purpose, the end of each of the outer bodies 34 cooperates with the ends of the corresponding tubular portion 38 of the inner body 32 by two bearing 52, 54, such as needle bearings.

The hydraulic unit (FIG. 2) associated with each of the actuators 16 is connected to the two outer bodies 34 of the latter by lines 55. More specifically, a first group of lines 55 issues into the chambers 48, whereas a second group of lines 55 issues into the chambers 50.

As a result of this arrangement, it is possible to pressurize the chambers 48, whilst connecting to the atmosphere the chambers 50, or vice versa, so as to control the rotation of the inner body 32 in the outer bodies 34 in one or other direction.

According to the invention, the section of at least one of the inner 32 and outer 34 bodies is tapered, so that the blades 40 and 44 have a height decreasing from one end to the other of said blades.

In the embodiment illustrated in the drawings, this feature is obtained by giving the outer tubular body 34 a uniform section, i.e. a cylindrical shape and giving each of the tubular portions 38 of the inner body 32 a tapered section.

Figure 3:
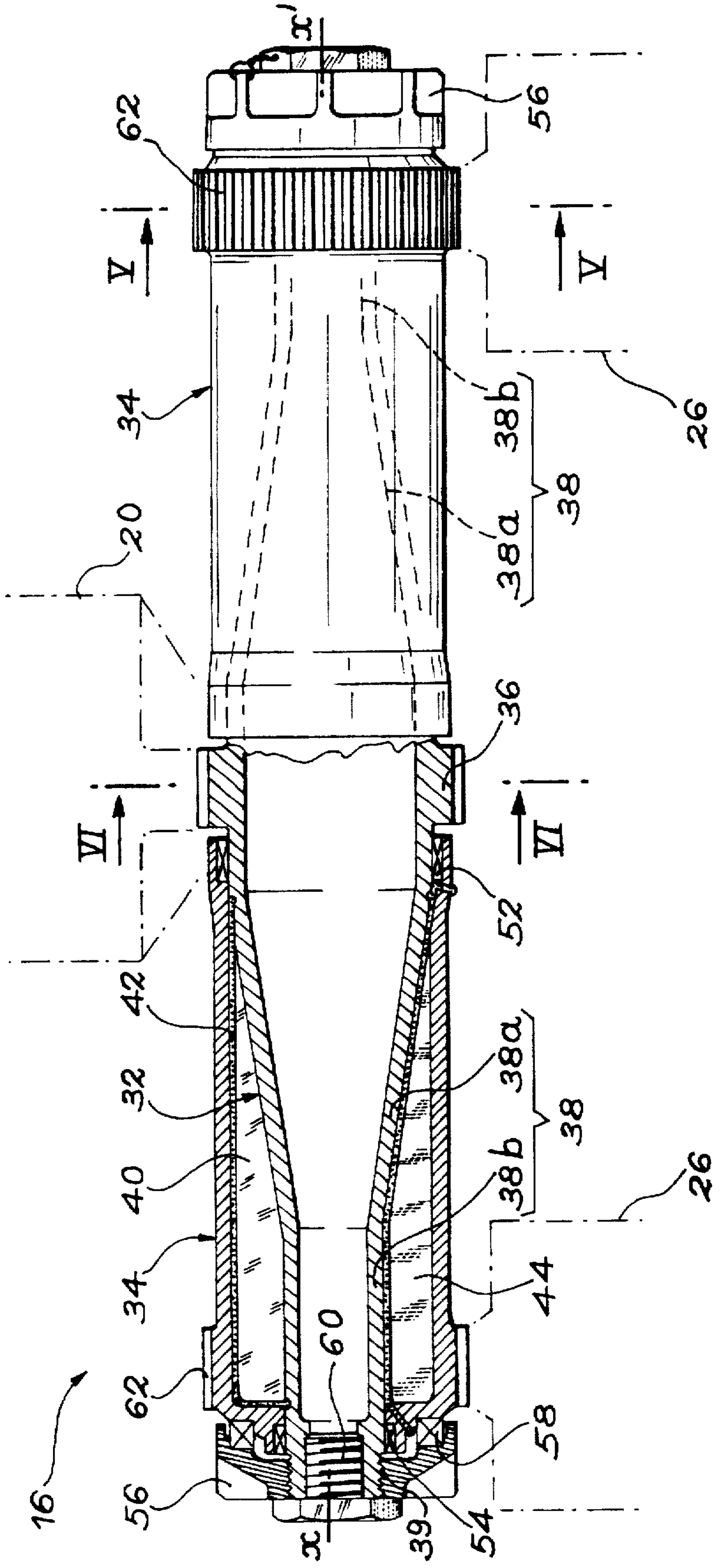
Figure 4:
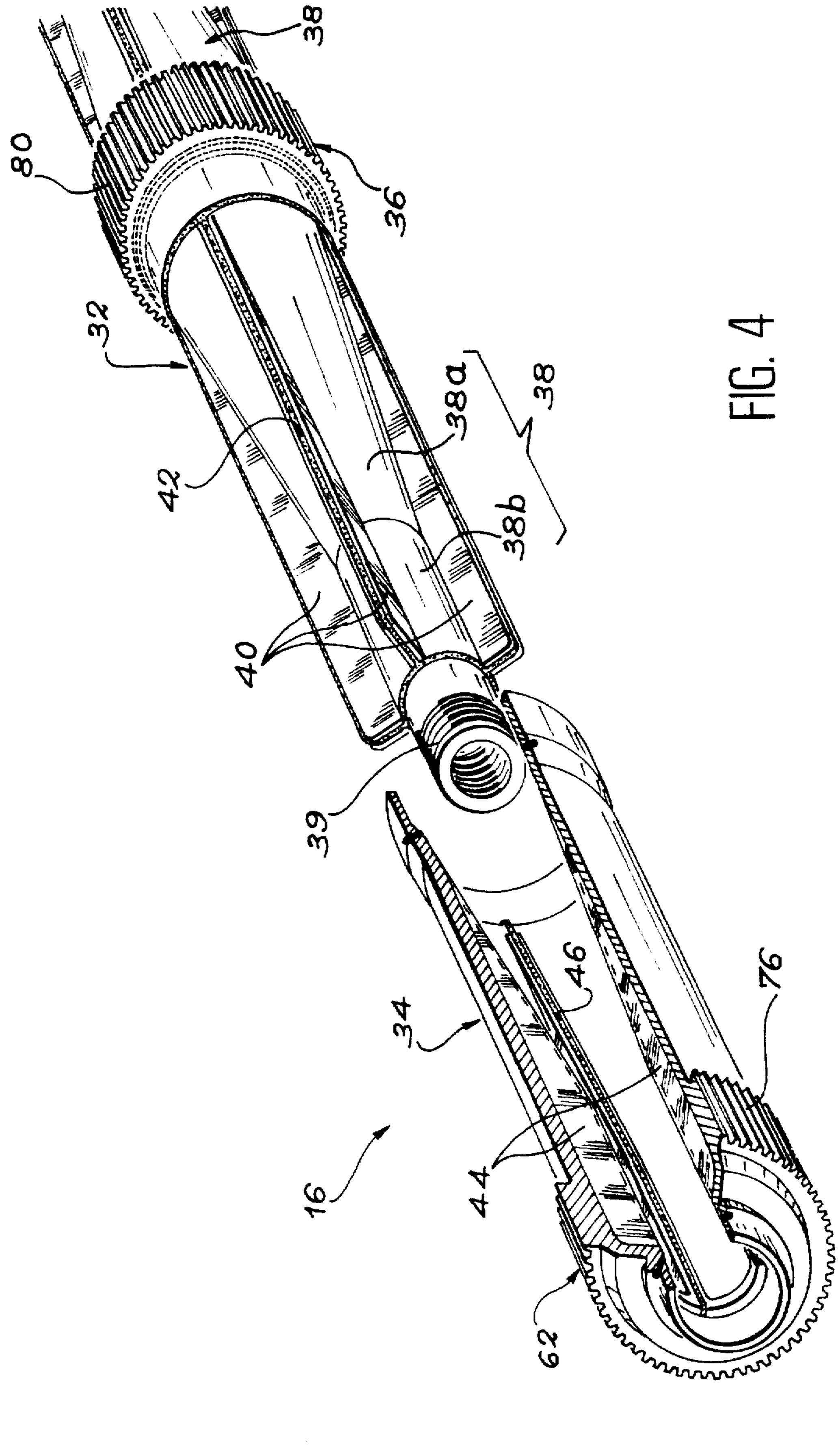

In the embodiment shown in FIGS. 3 and 4, the tapered section of each of the tubular portions 38 of the inner body 32 is obtained by forming in each portion 38 a substantially frustum-shaped part 38a, whose diameter decreases from the central force transmission portion 36, as well as a substantially cylindrical part 38b extending the relatively small diameter end of the substantially frustum-shaped part 38a up to the corresponding end of the actuator 16

As indicated hereinbefore, this shape is only given in an exemplified manner, the generatrix of each of the tubular portions 38 being able to assume a different shape, e.g. straight or inwardly curved.

In this configuration, the relatively large diameter end of the substantially frustum-shaped part 38a of each of the tubular portions 38 has an external diameter substantially equal to the diameter of the inner body 34 received on said tubular portion 38. Each of the blades 40, 44 has an approximately triangular shape. A simple calculation makes it possible to demonstrate that, for the same active surface of the blades and for an actuator having the same external diameter, the shape given to the blades 40 and 44 in the conical rotary actuator according to the invention makes it possible to increase by 16.7% the actuator efficiency as compared with a conventional cylindrical rotary actuator.

In addition, the shape of the inner body 32 constituting the actuator rotor reduces the deformation of said part in torsion by linearly increasing its diameter. This feature makes the torsional deformations of the inner body negligible compared with the deformations resulting from the pressurization of the chambers 48 or 50.

In order to permit the assembly and disassembly of each of the outer bodies 34 of the conical rotary actuator 16, the inner tubular body 32 is extended at each of its ends by a threaded part 39 (FIG. 4) on which is screwed a lock nut 56. A roller thrust bearing 58 is interposed between the nut 56 and an end face of the corresponding outer body 34, so as to permit the locking in translation of the inner body 32 without preventing its rotation. A hollow screw 60 is screwed into each of the ends of the inner body 32 so as to lock the corresponding nut 56.

Each terminal, force transmission portion 62 is engaged on one of the bearing 26 in accordance with an arrangement which will now be described in conjunction with FIG. 5.

Each of the bearings 26 is fitted to the rear spar 18 of the corresponding wing 10, so as to be able to rotate about an axis yy' perpendicular to the rear spar 18 and passing through the articulation axis xx' of the corresponding panel like the panel 12*a* in FIG. 5.

For this purpose, each of the bearings 26 has a planar face 64, which bears on the rear face of the rear spar 18 by means of a needle thrust bearing 68. A cylindrical portion 70 of the bearing 26 projects over the planar face 64 along the axis yy', traversing a circular passage formed in the rear spar 18. On the front face of the rear spar 18 a nut 72 is screwed onto a threaded pert of the cylindrical portion 70, so as to cooperate with said front face of the spar 18 by a second needle thrust bearing 74.

Moreover, each of the bearings 26 engages on the terminal force transmission portion 62 of the corresponding outer body 34 of the actuator by means of rotation linking means about the articulation axis xx' of the panel 12*a*. In the embodiment of FIG. 5 these rotation linking means are constituted by involute splines 76, formed in the terminal, force transmission portions and by complimentary splines 77 formed in a ring 28 of the rings bearing 26 surrounding said terminal portion.

It should be noted that this arrangement makes it possible to transmit forces between the actuator and the corresponding close to the wing skin panels. This makes it possible to reduce the overall dimensions of the bearings 26 between the rear spar 18 and the actual actuator 16. The thus freed space facilitates the passage of lines from the aircraft engines.

Moreover, one of the bearings 26 (e.g. that not shown in FIG. 5) carries translation linking means between said bearing and the corresponding outer body 34, in accordance with the articulation axis xx' of the panel 12*a*. These transmission linking means can be constituted by flanges integral with the bearing and which are positioned on either side of the ends of the splines 76 projecting over the outer surface of the corresponding outer body 34. However, the other bearing 26 is free in translation on the corresponding terminal, force transmission portion 62.

The arrangement described hereinbefore ensures the linking in translation of the actuator 16 and the rear spar 18 of the corresponding wing 10, whilst still permitting the necessary relative displacement for the bending of the wing.

Figure 6:
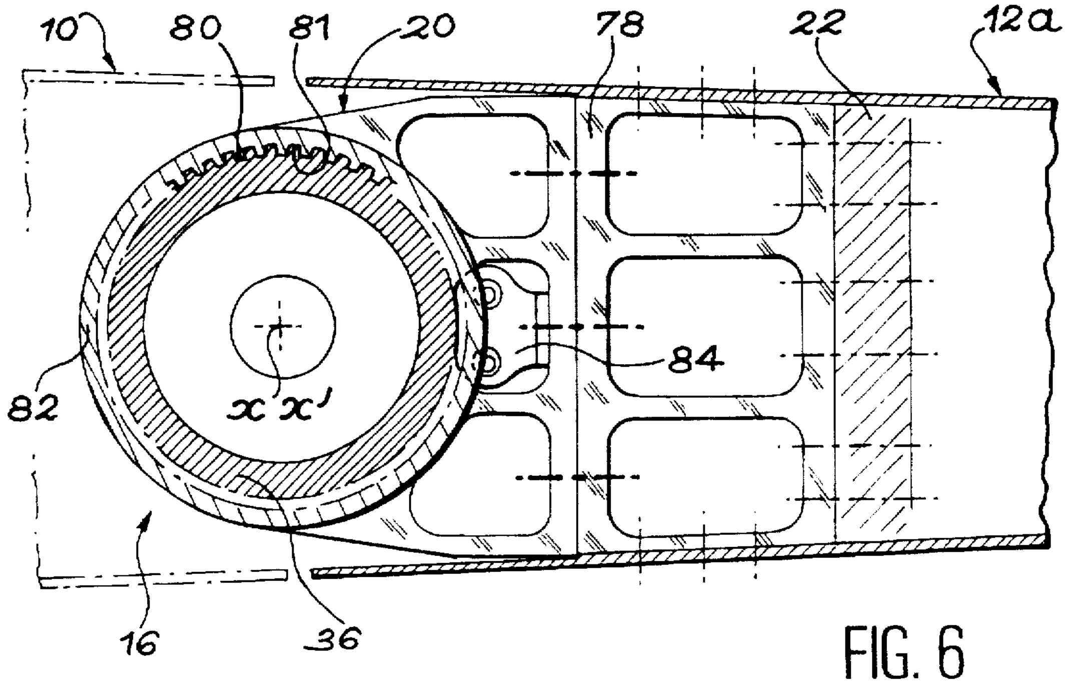

With reference to FIG. 6, a description will now be given of an embodiment of the bearing 20 connecting the inner body 32 of the actuator 16 to the panel 12*a*. As illustrated in FIG. 6, the bearing 20 is fixed to a force introduction fitting 78, which is itself fixed to the front spar 22 and to the median main rib 24 (FIG. 2) of the corresponding panel 12*a*.

This bearing 20 cooperates with the central force transmission portion 36 of the actuator 16 by rotation linking means. The rotation linking means includes splines 80, formed on the outer surface of the central, force transmission portion 36, and complimentary splines 81 formed in a ring 82 of the bearing 20 surrounding said central portion 36.

In addition, means are provided to ensure the linking in translation between the bearing 20 and the central, force transmission portion 36 of the actuator 16, along the pivoting axis xx' of the panel 12*a*. These translation linking means e.g. comprise two flanges 84, intergrated with the bearing 20 and located on either side of the ends of the splines 81, which project over the outer surface of the inner body 32.

As is very diagramatically illustrated at 86 in FIG. 2, the hollow nature of the inner, tubular body 32 of each of the actuators 16 makes it possible to connect inner bodies 32 in series by a spline 86 belonging to a heat transfer fluid temperature conditioning circuit. It is thus possible to bring about a circulation in the actuators of a heat transfer fluid making it possible to heat the latter in order to facilitate their operation when the outside temperature is too low.

To ensure that the failure of any one of the three circuits equipping the aircraft has no effect on the simultaneous operation of each of the three panels 12*a*, 12*b* and 12*c* of the elevon 12, at least one shackle 88 is preferably placed between each pair of adjacent elevon panels, substantially mid-chord of said panels. The shackles 88 also prevent the rotation of each of the panels about its central rib 24, which could occur as a result of its rotation by a single bearing 20.

Apart from the intrinsic advantages of the conical rotary actuators described hereinbefore, the use of said actuators for the control of the rudder of an aircraft leads to numerous advantages.

Thus, the installation of the actuators in the leading edge of rudders, which is normally unoccupied, frees space in an area which is normally very congested and in the vicinity of the rear of the rear spar of the wing.

Moreover, the force transfers between the actuators and the wing take place close to the skin panels of the latter, which reduces the forces and stresses introduced into the structures. It is thus possible to hollow out the structure of the bearing 20 close to its axis of symmetry.

As has already been stressed, a conical rotary actuator according to the invention can also be used in numerous industrial fields where a relatively small amplitude, alternating, rotary movement has to be controlled. In addition, as a function of the force to be exerted, said actuator can be single or double, as described hereinbefore. The number of blades is adapted to the amplitude of the movement to be controlled.

I claim:

1. A rotary actuator comprising an inner body and at least one outer body fitted coaxially in one another, at least one annular space defined between said inner and outer bodies, first blades integral with the inner body, second blades integral with the at least one outer body, said first and second blades being arranged in an alternating manner in said annular space to define alternating first and second variable volume control chambers, with different fluid tight control chambers being formed within said annular space, whereby an alternate pressurization of said first and second control chambers controls a relative rotation between the inner and outer bodies, wherein at least one of the inner and outer bodies has a variable cross-section, and each of the first and second blades has an approximately triangular shape, with a height decreasing from one end to the other.

2. The rotary actuator according to claim 1, wherein the outer body has a constant cross-section and the inner body has a variable cross-section.

3. The rotary actuator according to claim 2, wherein the inner body comprises a substantially frustum-shaped portion and a substantially cylindrical portion extending from a relatively small diameter end of the substantially frustum-shaped portion.

4. The rotary actuator according to claim 2, wherein a relatively large diameter end of the substantially frustum-shaped portion of the inner body has an external diameter equal to an internal diameter of the outer body.

5. The rotary actuator according to claim 1, wherein the inner body comprises a rotor and the outer body comprises a stator.

6. The rotary actuator according to claim 1, wherein the inner body has a tubular shape and is adapted to be connected to a heat transfer fluid temperature conditioning circuit.

7. A rotary actuator comprising an inner body and at least one outer body fitted coaxially in one another, at least one annular space defined between said inner and outer bodies, first blades integral with the inner body, second blades integral with the outer body, said first and second blades being arranged in an alternating manner in said annular space to define alternating first and second variable volume control chambers with different fluid tight control chambers being formed within said annular space, whereby an alternate pressurization of said first and second control chambers controls a relative rotation between the inner and outer bodies, wherein at least one of the inner and outer bodies has a variable cross-section, and each of the first and second blades has an approximately triangular shape, with a height decreasing from one end to the other; wherein the at least one outer body comprises two outer bodies fitted coaxially on two portions of the inner body, each one of said two portions carrying a set of said approximately triangular shaped first blades, and each outer body carrying a set of said approximately triangular shaped second blades which are arranged in an alternating manner with one of said set of first blades.

8. The rotary actuator according to claim 7, wherein the two portions of the inner body are symmetrical relative to a median plane of the actuator.

9. The rotary actuator according to claim 8, wherein a height of the first and second blades increases from the median plane of the actuator towards ends of said actuator.

10. The rotary actuator according to claim 7, wherein the inner body further comprises a central force transmission portion between said portions carrying the first blades, and each outer body comprises a terminal force transmission portion, in a vicinity of ends of said actuator.

11. An aircraft control surface, comprising at least one panel, articulated to a rear spar of an aircraft wing element, about an articulation axis substantially parallel to said rear spar, and pivoting control means for controlling pivoting of the at least one panel about said articulation axis, wherein said pivoting control means includes at least one rotary actuator comprising an inner body and at least one outer body fitted coaxially in one another, at least one annular space defined between the inner and outer bodies, first blades integral with the inner body and second blades integral with the outer body, the first and second blades being arranged in an alternating manner in said annular space to define alternating first and second variable volume fluid tight control chambers within said annular space, whereby an alternate pressurization of said first and second control chambers controls a relative rotation between the inner and outer bodies, wherein at least one of the inner and outer bodies provide a variable cross-section, each of the first and second blades having an approximately triangular shape, with a height decreasing from one end to the other.

12. The aircraft control surface of claim 11, wherein the at least one outer body comprises two outer bodies fitted coaxially on two portions of the inner body, each of said two portions carrying a set of said first blades, and each outer body carrying a set of said second blades, arranged in alternating manner with one of said sets of first blades, wherein the inner body further comprises a central force transmission portion between said portions carrying the first blades, and each outer body comprises a terminal force transmission portion, in a vicinity of ends of said actuator, and wherein the terminal force transmission portions are fitted in a plurality of first bearings carried by the rear spar and the central force transmission portion is fitted in a plurality of second bearings carried by said panel.

13. The aircraft control surface according to claim 12, wherein each of the plurality of first bearings is rotatably carried by the rear spar about a first axis perpendicular to said spar and passing through said articulation axis.

14. The aircraft control surface according to claim 12, wherein each of the plurality of first bearings is engaged on one of said terminal force transmission portions by a first rotation linking means, about said articulation axis, and the plurality of second bearings is engaged on the central force transmission portion by a second rotation linking means, about said articulation axis.

15. The aircraft control surface according to claim 11, wherein one of the first plurality of beatings is engaged in one of said terminal force transmission portions by first translation linking means, along said articulation axis, and the plurality of second bearings is engaged on the central force transmission portion by second translation linking means, along said articulation axis.

16. The aircraft control surface according to claim 11, wherein said at least one panel comprises at least two panels interconnected by at least one shackle, each of said panels being controlled by one rotary actuator housed in said panel.

* * * * *